(12) United States Patent
Jostmeier et al.

(10) Patent No.: US 8,453,424 B2
(45) Date of Patent: Jun. 4, 2013

(54) CHAIN LINK FOR AN ENERGY GUIDING CHAIN

(75) Inventors: Helmut Jostmeier, Murrhardt (DE); Andreas Kaufmann, Backnang (DE); Rainer Ruehle, Oppenweiler (DE)

(73) Assignee: Murrplastik Systemtechnik GmbH, Oppenweiler (DE)

( * ) Notice: Subject to any disclaimer, the term of this patent is extended or adjusted under 35 U.S.C. 154(b) by 215 days.

(21) Appl. No.: 12/737,970

(22) PCT Filed: Sep. 9, 2009

(86) PCT No.: PCT/EP2009/061666
§ 371 (c)(1),
(2), (4) Date: Mar. 4, 2011

(87) PCT Pub. No.: WO2010/029092
PCT Pub. Date: Mar. 18, 2010

(65) Prior Publication Data
US 2011/0154800 A1  Jun. 30, 2011

(30) Foreign Application Priority Data
Sep. 10, 2008  (DE) .................. 10 2008 046 700

(51) Int. Cl.
*F16G 13/16* (2006.01)
(52) U.S. Cl.
USPC ................ 59/78.1; 59/900; 248/49; 248/51
(58) Field of Classification Search
USPC ................... 59/78.1, 900; 248/49, 51
See application file for complete search history.

(56) References Cited

U.S. PATENT DOCUMENTS 3,921,388 A * 11/1975 Loos et al. ............ 59/78.1
4,590,961 A  5/1986 Schumann
(Continued)

FOREIGN PATENT DOCUMENTS

DE  39 28 238  10/1990
DE  41 05 653  9/1992
(Continued)

OTHER PUBLICATIONS

International Search Report.
(Continued)

*Primary Examiner* — David B Jones
(74) *Attorney, Agent, or Firm* — Collard & Roe, P.C.

(57) ABSTRACT

The invention relates to a chain link (10) for an energy guiding chain, comprising two lateral links (12, 14) arranged at a distance from each other and parallel to each other, and at least one frame section (16) connecting the lateral links (12, 14) together. Each lateral link (12, 14) carries an abutment device (20) in a first end region (18), that can be connected to the lateral link (12, 14) in a detachable and fixed manner, and comprises a disk (22) and at least one abutment element projecting from a first surface (24) of the disk (22). Each lateral link (12, 14) comprises, in its second end region (28), a number of recesses (32), corresponding to the number of abutment elements (26), for receiving the abutment elements (26) of a chain link in the longitudinal direction of the chain and for defining the pivoting angle between the successive chain links. According to the invention, each lateral link (12, 14) comprises a plurality of wall holes (40) in its first end region (18), and each abutment device (20) comprises a number of fixing elements, corresponding to the number of wall holes (40), protruding from a second surface (34) of the disk, which faces away from the first surface (24), the fixing elements being complementary to the shape of the wall holes (40), and at least partially penetrating the wall holes (40).

9 Claims, 2 Drawing Sheets

U.S. PATENT DOCUMENTS

Figure 1:
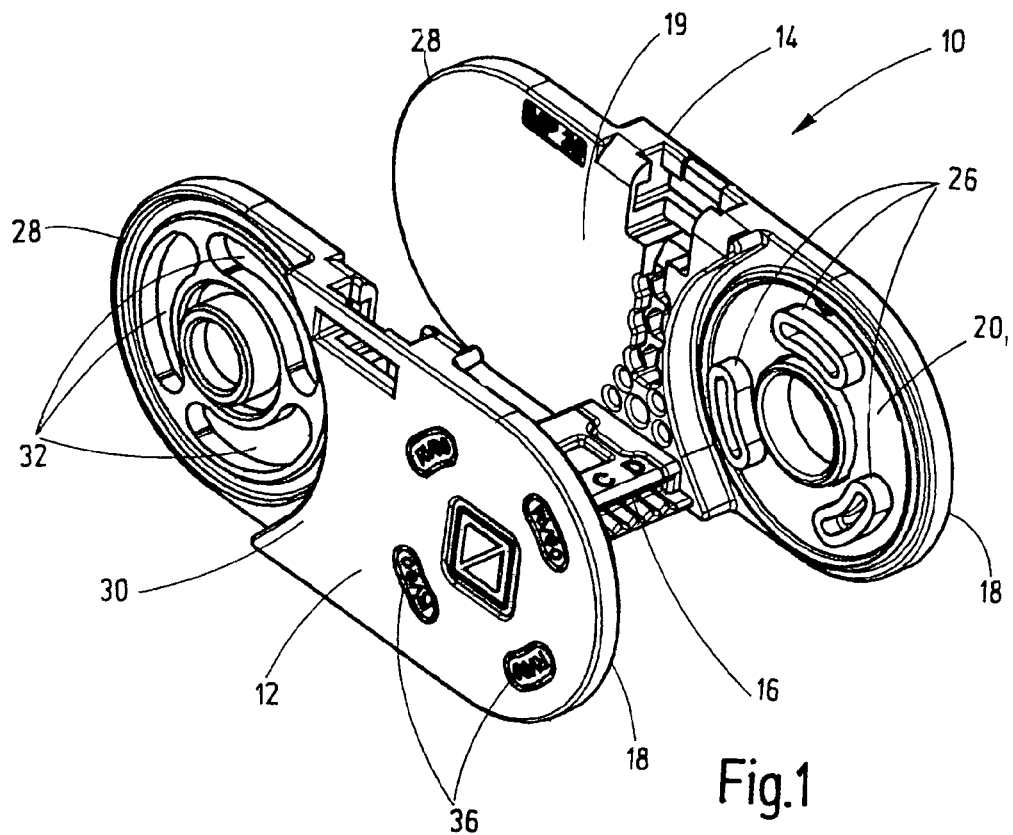

| | | | |
|---|---|---|---|
| 4,800,714 A | | 1/1989 | Moritz |
| 5,048,283 A | | 9/1991 | Moritz et al. |
| 5,108,350 A | * | 4/1992 | Szpakowski .................. 59/78.1 |
| 5,157,913 A | * | 10/1992 | Wehler et al. ................. 59/78.1 |
| 5,174,104 A | * | 12/1992 | Wehler et al. ................. 59/78.1 |
| 5,247,961 A | * | 9/1993 | Micheau et al. ................ 248/49 |
| 6,161,372 A | * | 12/2000 | Wehler .......................... 59/78.1 |
| 6,992,254 B2 | * | 1/2006 | Komiya .......................... 248/51 |
| 7,334,388 B2 | * | 2/2008 | Eckl et al. ..................... 59/78.1 |
| 7,591,128 B2 | * | 9/2009 | Komiya ......................... 59/78.1 |

FOREIGN PATENT DOCUMENTS

| | | |
|---|---|---|
| DE | 692 01 684 | 10/1995 |
| DE | 197 07 966 | 9/1998 |
| DE | 10 2005 011 934 | 10/2006 |
| DE | 11 2004 000 584 | 10/2008 |
| EP | 0 246 502 | 11/1987 |
| EP | 0 520 915 | 12/1992 |
| EP | 1 703 168 | 9/2006 |

OTHER PUBLICATIONS

German Search Report dated Aug. 24, 2009 with English translation of relevant parts.

* cited by examiner

CHAIN LINK FOR AN ENERGY GUIDING CHAIN

CROSS REFERENCE TO RELATED APPLICATIONS

This application is the National Stage of PCT/EP2009/061666 filed on Sep. 9, 2009, which claims priority under 35 U.S.C. §119 of German Application No. 10 2008 046 700.6 filed on Sep. 10, 2008, the disclosure of which is incorporated by reference. The international application under PCT article 21(2) was not published in English.

The invention relates to a chain link for an energy guiding chain, in accordance with the preamble of claim 1.

Such chain links are strung together in the longitudinal direction to form an energy guiding chain, in that the first end regions of the lateral links of a first chain link are connected with the second end regions of the lateral links of a second chain link. The chain links that follow one another can preferably be pivoted relative to one another, within limits, in that the stop elements can be moved, within limits, in the depressions of the subsequent chain link, in each instance. In this connection, it is known to use stop devices in the form of so-called radius disks that are attached to the lateral link in releasable manner, so as not to rotate, and whose stop elements are configured in arc shape. The depressions for accommodating the stop elements are also configured in arc shape, but extend over a greater angle, so that the stop elements can move back and forth on them. It is understood that the stop elements and the depressions have a common circle center point at each articulation, when the energy guiding chain is assembled. Attachment of the radius disks on the lateral link takes place, in the case of known energy guiding chains, in that they have nubs as attachment elements on the side facing away from the stop elements, which nubs are inserted, with precise fit, into further depressions in the wall of the lateral link, in order to attach the lateral link. However, this arrangement results in the disadvantage that the depressions cannot be selected to have just any desired depth, so that the attachment nubs are relatively flat and the forces that they can absorb are therefore restricted. Furthermore, it is not evident from the outside what type of radius disks are installed in the energy guiding chain.

It is therefore the task of the invention to further develop a chain link of the type stated initially, in such a manner that it is better able to withstand stress.

This task is accomplished, according to the invention, by means of a chain link having the characteristics of claim 1.

Advantageous further developments of the invention are the object of the dependent claims.

The invention is based on the idea that the attachment elements can be introduced into the wall perforations or passed through them to almost any desired extent, so that their height is not as greatly restricted as in the case of the known radius disks. Furthermore, in the case of this type of affixing from the outside, the attachment elements are visible from the outside even when the energy guiding chain is assembled, and this gives the chain an attractive design. Finally, if corresponding labeling is provided, it can be read what type of radius disk is being used in the energy guiding chain.

Attachment of the stop device in the lateral link is further improved if the attachment elements are inserted into the wall perforations with precise fit. It is practical if the attachment elements have a height that corresponds to the thickness of the walls of the lateral links that have the wall perforations. The attachment elements then end flat with the outer surface of the chain link, thereby optimally utilizing the wall thickness, without parts of the outer surface projecting. As a design feature, the attachment elements can have a different color from the lateral links. In order to make the stop device identifiable from the outside, it is preferred that at least a part of the attachment elements, in each instance, carry a labeling on a labeling surface that is parallel to the second surface of the disk, which labeling is therefore visible through the wall perforation, in each instance.

It is advantageous if each of the disks is disposed on an inside of the lateral link, in each instance, facing the other lateral link. The attachment elements then engage through the wall perforations from the inside to the outside. It is practical if the attachment elements and the stop elements are disposed concentrically about a center point of the disk.

For the two lateral links, which form a left and a right delimitation of the chain link, viewed in the longitudinal direction of the energy guiding chain, two different stop devices are necessary, for reasons of symmetry. In order to avoid errors in the assembly, it is preferred that the attachment elements are disposed, at least in part, at different angular distances relative to one another. A left stop device therefore cannot be inserted into a right lateral link, and vice versa. To form an energy guiding chain, a plurality of such chain links is strung together with one another, in the longitudinal chain direction, in such a manner that the stop elements of a chain link engage into the depressions of the subsequent chain link.

Figure 2:
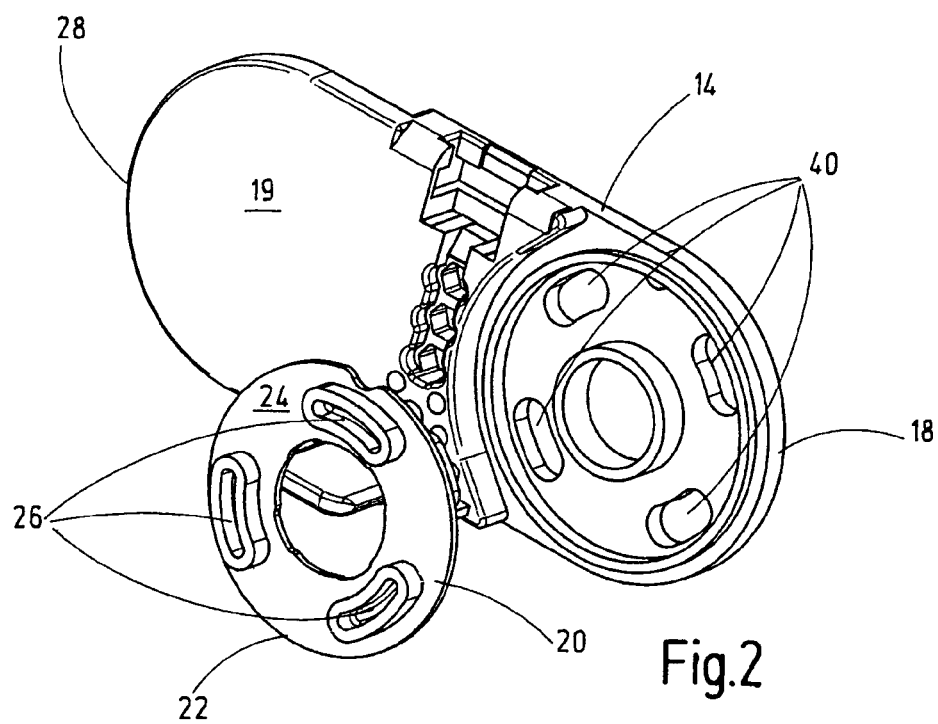

In the following, the invention will be explained in greater detail using an exemplary embodiment shown schematically in the drawing. This shows:

FIG. 1 a chain link with the upper frame crosspiece removed;

FIG. 2 a lateral link with the related stop device, and

Figures 3A, 3B:
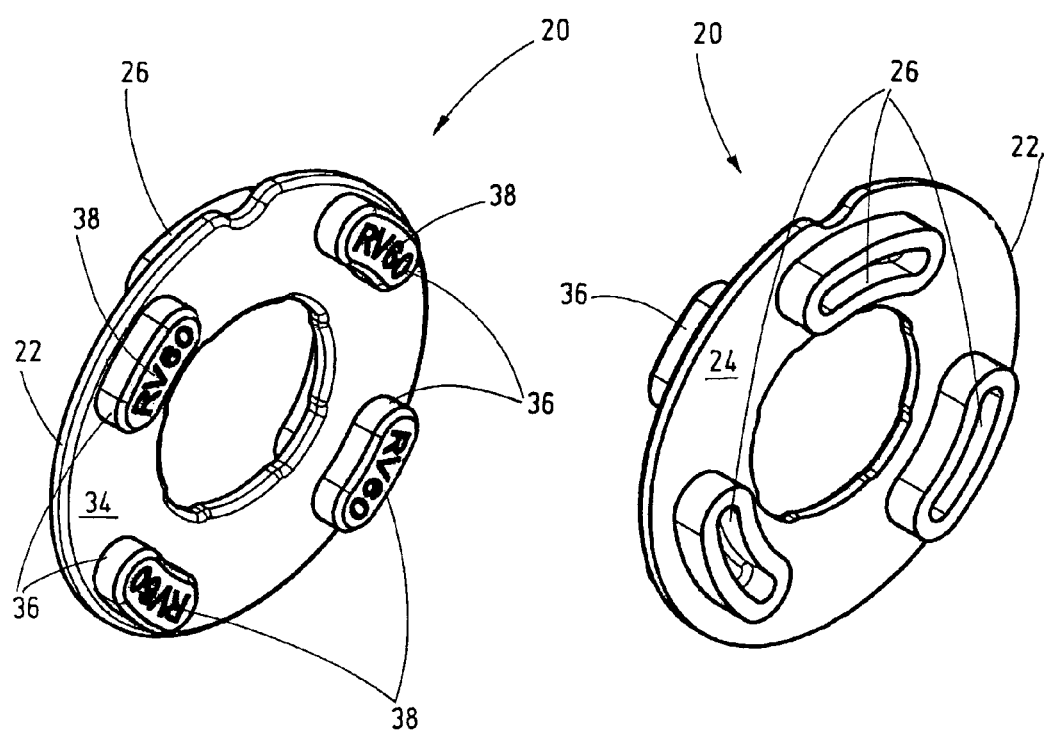

FIG. 3*a*, 3*b* a stop device configured as a radius disk, in a perspective view, from the front and from the back.

The chain link 10 shown in FIG. 1 has two lateral links 12, 14 that are disposed parallel at a distance from one another. The two lateral links 12, 14 are connected with one another by means of a frame crosspiece 16 on the underside of the chain link 10. An upper frame crosspiece is also provided, but is not shown in the representation according to FIG. 1. The chain link 10 shown is intended for forming an articulated energy guiding chain, together with other chain links having the same construction, in which chain the chain links are connected with one another, strung together in the longitudinal chain direction, so that they can pivot relative to one another, with restrictions. The lateral links 12, 14 and the frame crosspieces 16 of the energy guiding chain delimit a guiding channel in which supply lines such as electrical cables, for example, are accommodated, protected against environmental influences.

In order to establish the maximal pivoting angle between two consecutive chain links, the lateral links 12, 14 of the chain link 10 shown as an example in FIG. 1 have a stop device in the form of a radius disk 20 in their first end region 18, on the inside 19, in each instance. The latter has a circular disk 22 that has three arc-shaped stop elements 26 disposed at a constant angle distance from one another, on its first surface 24 that faces the viewer in FIGS. 1 and 2. In their second end region 28, the lateral links 12, 14 have three arc-shaped depressions 32, on their outside 30, in each instance, into which the stop elements 26 of the subsequent chain link are inserted when the energy guiding chain is assembled. The depressions 32 extend over a greater angle region than the stop elements 26, so that the latter can be moved back and forth in the depressions 32, to pivot the chain links relative to one another.

The stop devices 20, which are shown in detail in FIG. 3a, 3b, are produced in one piece as injection-molded parts, just like the lateral links 12, 14 are produced as injection-molded parts. On the second surface 34 of the disk 22 that faces away from the first surface 24, four nub-like attachment elements 36 project, which carry a labeling for identifying the stop device 20, on a labeling surface 38 that is parallel to the second surface 34, in each instance. The attachment elements 36 are inserted into wall perforations 40 in the lateral link 12, 14, in order to attach the stop device 20 on the lateral link 12, 14, in each instance. In this connection, the attachment elements 36 have a height that corresponds to the wall thickness in the region of the wall perforations 40, so that the labeling surfaces 38 are disposed to be flat with the outside 30. The attachment elements 36 are furthermore inserted into the wall perforations 40 with precise fit, so that a stable connection between the stop device 20 and the lateral link 12, 14, in each instance, is achieved. The labeling on the labeling surfaces 38, which indicates the type of stop device 20, can be read, as is shown in FIG. 1, even if the energy guiding chain has been assembled and is in use. Furthermore, a design feature that indicates the manufacturer, for example, is achieved if plastics having different colors are used for the lateral links 12, 14, on the one hand, and for the stop devices 20, on the other hand.

Because of the mirror symmetry of the chain link 10, with regard to its longitudinal center plane, a different stop device 20 must be attached on the left lateral link 12 than on the right lateral link 14. In order to avoid inserting an incorrect stop device 20 into one of the lateral links 12, 14, the attachment elements 36 have different angle distances from one another, in part, which are adapted to the angle distances of the wall perforations 40. The stop elements 26 are disposed, with regard to the depressions 32, in such a manner that when identical chain links 10 are assembled, the energy guiding chain has a slight curvature, so that it runs almost straight due to its weight and its elasticity.

In summary, the following should be stated: The invention relates to a chain link 10 for an energy guiding chain, having two lateral links 12, 14 disposed at a distance from one another and parallel to one another, and having at least one frame crosspiece 16 that connects the lateral links 12, 14 with one another, whereby each of the lateral links 12, 14 carries a stop device 20, in a first end region 18, which is connected with the lateral link 12, 14 in releasable and immovable manner, and has a disk 22 as well as at least one stop element 26 that projects out of a first surface 24 of the disk 22, and whereby each of the lateral links 12, 14, in its second end region 28, has a number of depressions 32 for accommodating the stop elements 26 of a subsequent chain link, in the longitudinal chain direction, and limiting the pivoting angle between the consecutive chain links, which number corresponds to the number of stop elements 26. According to the invention, it is provided that each of the lateral links 12, 14 has multiple wall perforations 40 in its first end region 18, and that each stop device 20 has a number of attachment elements 36, corresponding to the number of wall perforations 40, which elements project out of a second surface 34 of the disk 22, which faces away from the first surface 24, are complementary to the shape of the wall perforations 40, and pass through the wall perforations 40, at least in part.

The invention claimed is:

1. A chain link for an energy guiding chain, the chain link comprising:
    a first lateral link having a first lateral link first end region, having a first lateral link second end region, having multiple first lateral link wall perforations in the first lateral link first end region, having a first lateral link stop device in the first lateral link first end region, and having a number of first lateral link depressions,
    a second lateral link having a second lateral link first end region, having a second lateral link second end region, having multiple second lateral link wall perforations in the second lateral link first end region, having a second lateral link stop device in the second lateral link first end region, and having a number of second lateral link depressions, and
    at least one frame crosspiece connecting the first lateral link and the second lateral link, the first lateral link being disposed at a distance from and parallel to the second lateral link,
    wherein the first lateral link stop device is connected with the first lateral link in a releasable and immovable manner, has a first stop device disk, has at least one first stop device stop element, and has a number of first stop device disk attachment elements,
    wherein the first stop device disk has a first stop device disk first surface and a first stop device disk second surface facing away from the first stop device disk first surface,
    wherein the first stop device disk attachment elements project out of the first stop device disk second surface, are complementary to the shape of the first lateral link wall perforations, and pass through the multiple' first lateral link wall perforations at least in part,
    wherein the number of first stop device disk attachment elements corresponds to a number of the multiple first lateral link wall perforations,
    wherein the first lateral link depressions are in the first lateral link second end region, are for accommodating first stop elements of a subsequent chain link, and limit a pivot angle between the chain link and the subsequent chain link,
    wherein the subsequent chain link is disposed in a longitudinal direction with respect to the chain link, and
    wherein the number of first lateral link depressions corresponds to the number of first stop elements in the subsequent chain link,
    wherein the second lateral link stop device is connected with the second lateral link in a releasable and immovable manner, has a second stop device disk, has at least one second stop device stop element, and has a number of second stop device disk attachment elements,
    wherein the second stop device disk has a second stop device disk first surface and a second stop device disk second surface facing away from the second stop device disk first surface,
    wherein the second stop device disk attachment elements project out of the second stop device disk second surface, are complementary to the shape of the second lateral link wall perforations, and pass through the multiple second lateral link wall perforations at least in part,
    wherein the number of second stop device disk attachment elements corresponds to a number of the multiple second lateral link wall perforations,
    wherein the second lateral link depressions are in the second lateral link second end region, are for accommodating second stop elements of the subsequent chain link, and limit the pivot angle between the chain link and the subsequent chain link, and
    wherein the number of second lateral link depressions corresponds to the number of the second stop elements in the subsequent chain link.

2. The chain link according to claim 1, wherein the first stop device disk attachment elements are inserted into the multiple first lateral link wall perforations with precise fit.

3. The chain link according to claim 1, wherein the first lateral link further comprises a first lateral link wall, the first lateral link wall having the multiple first lateral link wall perforations, and
  wherein the second lateral link further comprises a second lateral link wall, the second lateral link wall having the multiple second lateral link wall perforations.

4. The chain link according to claim 1, wherein the first stop device disk attachment elements have a first color,
  wherein the first lateral link has a second color, and
  wherein the first color is different from the second color.

5. The chain link according to claim 1, wherein each first stop device disk attachment element has a respective first stop device disk attachment element labeling surface disposed parallel to the first stop device disk first surface, and
  wherein at least a part of the first stop device disk attachment elements carry a labeling, in each instance, on the respective labeling surface.

6. The chain link according to claim 1, wherein the first lateral link has a first lateral link inside,
  wherein the second lateral link has a second lateral link inside facing the first lateral link inside,
  wherein the first stop device disk is disposed on the first lateral link inside, and
  wherein the second stop device is disposed on the second lateral link inside.

7. The chain link according to claim 1, wherein the first stop device disk attachment elements are disposed concentrically about a center point of the first stop device disk.

8. The chain link according to claim 7, wherein the first stop device disk attachment elements are disposed at different angle distances from one another, at least in part.

9. An energy guiding chain having a plurality of chain links strung together in a longitudinal chain direction, wherein each chain link comprises:
  a first lateral link having a first lateral link first end region, having a first lateral link second end region, having multiple first lateral link wall perforations in the first lateral link first end region, having a first lateral link stop device in the first lateral link first end region, and having a number of first lateral link depressions,
  a second lateral link having a second lateral link first end region, having a second lateral link second end region, having multiple second lateral link wall perforations in the second lateral link first end region, having a second lateral link stop device in the second lateral link first end region, and having a number of second lateral link depressions, and
  at least one frame crosspiece connecting the first lateral link and the second lateral link, the first lateral link being disposed at a distance from and parallel to the second lateral link,
  wherein the first lateral link stop device is connected with the first lateral link in a releasable and immovable manner, has a first stop device disk, has at least one first stop device stop element, and has a number of first stop device disk attachment elements,
  wherein the first stop device disk has a first stop device disk first surface and a first stop device disk second surface facing away from the first stop device disk first surface,
  wherein the first stop device disk attachment elements project out of the first stop device disk second surface, are complementary to the shape of the first lateral link wall perforations, and pass through the multiple first lateral link wall perforations at least in part,
  wherein the number of first stop device disk attachment elements corresponds to a number of the multiple first lateral link wall perforations,
  wherein the first lateral link depressions are in the first lateral link second end region, are for accommodating first stop elements of a subsequent chain link, and limit a pivot angle between the chain link and the subsequent chain link,
  wherein the subsequent chain link is disposed in a longitudinal direction with respect to the chain link, and
  wherein the number of first lateral link depressions corresponds to the number of first stop elements in the subsequent chain link,
  wherein the second lateral link stop device is connected with the second lateral link in a releasable and immovable manner, has a second stop device disk, has at least one second stop device stop element, and has a number of second stop device disk attachment elements,
  wherein the second stop device disk has a second stop device disk first surface and a second stop device disk second surface facing away from the second stop device disk first surface,
  wherein the second stop device disk attachment elements project out of the second stop device disk second surface, are complementary to the shape of the second lateral link wall perforations, and pass through the multiple second lateral link wall perforations at least in part,
  wherein the number of second stop device disk attachment elements corresponds to a number of the multiple second lateral link wall perforations,
  wherein the second lateral link depressions are in the second lateral link second end region, are for accommodating second stop elements of the subsequent chain link, and limit the pivot angle between the chain link and the subsequent chain link, and
  wherein the number of second lateral link depressions corresponds to the number of the second stop elements in the subsequent chain link.

* * * * *

UNITED STATES PATENT AND TRADEMARK OFFICE
CERTIFICATE OF CORRECTION

PATENT NO. : 8,453,424 B2
APPLICATION NO. : 12/737970
DATED : June 4, 2013
INVENTOR(S) : Jostmeier et al.

It is certified that error appears in the above-identified patent and that said Letters Patent is hereby corrected as shown below:

In the Claims

In particular, in Column 4, line 25, (Line 31 of Claim 1) please change "multiple'" to correctly read: --multiple--.

Signed and Sealed this
Twenty-third Day of July, 2013

Teresa Stanek Rea
*Acting Director of the United States Patent and Trademark Office*